(12) United States Patent
Wisse et al.

(10) Patent No.: US 9,924,699 B2
(45) Date of Patent: Mar. 27, 2018

(54) SYSTEM AND METHOD FOR PERFORMING AN ANIMAL-RELATED ACTION

(71) Applicant: LELY PATENT N.V., Maassluis (NL)

(72) Inventors: Dik-Jan Wisse, Maassluis (NL); Jan Martinus Van Kuilenburg, Maassluis (NL); Karel Van Den Berg, Maassluis (NL); Pieter Jacob Kik, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 14/426,061

(22) PCT Filed: Aug. 1, 2013

(86) PCT No.: PCT/NL2013/050574
§ 371 (c)(1),
(2) Date: Mar. 4, 2015

(87) PCT Pub. No.: WO2014/038932
PCT Pub. Date: Mar. 13, 2014

(65) Prior Publication Data
US 2015/0230427 A1 Aug. 20, 2015

(30) Foreign Application Priority Data

Sep. 4, 2012 (NL) ..................................... 2009410

(51) Int. Cl.
*G06F 7/00* (2006.01)
*G06F 17/00* (2006.01)
(Continued)

(52) U.S. Cl.
CPC ................ *A01K 5/02* (2013.01); *A01K 29/00* (2013.01); *A47L 9/009* (2013.01); *G05D 1/0022* (2013.01); *G05D 1/0088* (2013.01); *G05D 1/021* (2013.01)

(58) Field of Classification Search
CPC ........ A01K 1/01; A01K 1/0128; A01K 1/105; A01K 5/02; A01K 5/0266; A01K 7/02;
(Continued)

(56) References Cited

U.S. PATENT DOCUMENTS 5,926,909 A * 7/1999 McGee ...................... A47L 5/24
15/339
6,216,053 B1 * 4/2001 Cureton .................... A01K 5/02
348/E13.004
(Continued)

FOREIGN PATENT DOCUMENTS

DE 20 2011 050 205 U1 7/2011
EP 0 739 161 A1 10/1998
(Continued)

*Primary Examiner* — Khoi H Tran
*Assistant Examiner* — Jorge O Peche
(74) *Attorney, Agent, or Firm* — Birch, Stewart, Kolasch & Birch, LLP (57) ABSTRACT

A system for performing an animal-related action includes a self-propelled vehicle with a regulating unit including a transmitting and receiving device. The regulating unit is connected to a drive and control system of the vehicle, including an electric drive motor and a battery system. The system includes a central operating system provided with a transmitting and receiving device designed to communicate with the transmitting and receiving device of the vehicle. The central operating system includes a memory in which data are stored comprising navigation data, on the basis of which the vehicle is able to travel a predetermined route from a charging station, through at least a part of the operating area, and then back to the charging station. The central operating system transmits a packet of data including these navigation data to the regulating unit of the vehicle.

18 Claims, 1 Drawing Sheet

(51) Int. Cl.
    *A01K 5/02*     (2006.01)
    *G05D 1/00*     (2006.01)
    *A01K 29/00*    (2006.01)
    *G05D 1/02*     (2006.01)
    *A47L 9/00*     (2006.01)

(58) Field of Classification Search
    CPC ........ A01K 9/00; A01K 15/029; A01K 29/00;
        A01K 5/001; A47L 9/009; B01F 15/0295;
        B01F 9/103; B66C 3/02
    See application file for complete search history.

(56) References Cited

U.S. PATENT DOCUMENTS

| | | | | |
|---|---|---|---|---|
| 8,918,950 | B2* | 12/2014 | Song | A47L 5/225 15/319 |
| 9,008,835 | B2* | 4/2015 | Dubrovsky | G05B 19/409 700/245 |
| 9,315,187 | B2* | 4/2016 | Stenson | B60K 6/445 |
| 9,687,131 | B2* | 6/2017 | Eidmohammadi | G05D 1/0225 |
| 2002/0153184 | A1* | 10/2002 | Song | A47L 9/009 180/167 |
| 2002/0153185 | A1* | 10/2002 | Song | A47L 9/009 180/167 |
| 2003/0236601 | A1* | 12/2003 | McLeod | G07C 5/008 701/31.4 |
| 2005/0267631 | A1* | 12/2005 | Lee | G05D 1/0253 700/245 |
| 2006/0076917 | A1* | 4/2006 | Lim | G05D 1/0246 318/568.12 |
| 2006/0178085 | A1* | 8/2006 | Sotereanos | A63H 17/006 446/456 |
| 2007/0244610 | A1* | 10/2007 | Ozick | A47L 5/30 701/23 |
| 2007/0250212 | A1* | 10/2007 | Halloran | A47L 5/30 700/245 |
| 2007/0280052 | A1* | 12/2007 | Kong | G01S 5/26 367/128 |
| 2008/0173247 | A1* | 7/2008 | Mainini | A01K 1/01 119/161 |
| 2009/0319083 | A1* | 12/2009 | Jones | A47L 9/009 700/259 |
| 2010/0295803 | A1* | 11/2010 | Kim | G06F 3/0488 345/173 |
| 2010/0304640 | A1* | 12/2010 | Sofman | A63H 17/40 446/456 |
| 2010/0305752 | A1* | 12/2010 | Abramson | G01S 1/70 700/245 |
| 2010/0326363 | A1* | 12/2010 | Van Den Berg | A01K 1/105 119/57.92 |
| 2011/0185975 | A1* | 8/2011 | Van Den Berg | A01K 1/01 119/57.92 |
| 2012/0090110 | A1* | 4/2012 | Van Den Berg | A01K 1/01 15/93.1 |
| 2012/0112697 | A1* | 5/2012 | Heuer | B60L 11/1818 320/109 |
| 2012/0239224 | A1* | 9/2012 | McCabe | B66F 9/063 701/2 |
| 2013/0324357 | A1* | 12/2013 | Stenson | B60W 20/10 477/3 |
| 2013/0342310 | A1* | 12/2013 | Park | B60L 3/12 340/5.7 |
| 2014/0009561 | A1* | 1/2014 | Sutherland | B25J 5/007 348/14.05 |
| 2014/0222271 | A1* | 8/2014 | Merten | H02J 7/025 701/22 |
| 2015/0245587 | A1* | 9/2015 | Van Den Berg | A01K 1/01 134/6 |
| 2017/0055494 | A1* | 3/2017 | Ruizenaar | A01K 5/02 |
| 2017/0156287 | A1* | 6/2017 | Ruizenaar | A01K 5/0283 |

FOREIGN PATENT DOCUMENTS

| | | |
|---|---|---|
| EP | 0 943 235 A2 | 9/1999 |
| EP | 2169501 A1 | 3/2010 |
| WO | WO 96/14732 A1 | 5/1996 |
| WO | WO 96/14735 A1 | 5/1996 |
| WO | WO 00/70935 A1 | 11/2000 |
| WO | WO 00/70937 A1 | 11/2000 |
| WO | WO 2005/067704 A1 | 7/2005 |
| WO | WO 2007/071406 A2 | 6/2007 |
| WO | WO 2008/097080 A1 | 8/2008 |

* cited by examiner

SYSTEM AND METHOD FOR PERFORMING AN ANIMAL-RELATED ACTION

The invention relates to a system for performing an animal-related action.

A feed vehicle is known from EP 0739161 for feeding silage and/or feed concentrate to animals, such as cows. The feed vehicle is automatically movable between one or more feed-loading stations and one or more feed-releasing stations, such as the standing stations for the animals. The standing stations are disposed in a livestock building along a feedway, wherein the standing stations run crosswise in relation to the feedway and the animals stand with their heads toward the feedway. The feed-loading stations are formed by silos. The feed vehicle is guided during operation by markers which are each separately recognizable. The feed vehicle comprises an on-board computer and communication means for exchanging information and instructions with a central computer. The data relating to all positioned markers are entered into the on-board computer, together with the associated object or travel path and the dimensions thereof. The dimensions and positions of markers are programmed on a one-off basis by the farmer when the feed vehicle is commissioned. This is done by means of a run accompanied by the farmer, wherein the feed vehicle is controlled manually along the required route and objects suitable as markers are chosen as such by the farmer and are recorded in the on-board computer. The feed vehicle then makes as many runs along the set route as are necessary for the feed provision or according to the central computer. Along the route, the two markers detected as closest are always used for the computer-based recording of the position, orientation and speed of travel of the feed vehicle. With this feed vehicle, all farm-specific data are thus stored in the memory of the on-board computer. If the feed vehicle has to be replaced with a replacement feed vehicle, for example in the event of a fault or theft, the replacement feed vehicle must be programmed once more with the farm-specific data. Also, if a second feed vehicle needs to be used along with the first feed vehicle, the farm-specific data must be programmed once more into the second feed vehicle. In the event of theft of the feed vehicle, it is furthermore a disadvantage that confidential business information relating to the farm can fall into the wrong hands from the memory of the on-board computer.

One object of the invention is to provide an improved system for performing an animal-related action, in particular a system enabling safe and reliable long-term operation.

This object is achieved according to the invention by a system for performing an animal-related action, said system comprising:

an operating area with a substrate on which material lies, for example feed and/or manure,
a self-propelled vehicle, which is provided with:
  a plurality of wheels, which are movable over the substrate,
  a drive and control system for driving and controlling the vehicle, said drive and control system of the vehicle being provided with an electric drive motor and a battery system for storing electrical energy, said battery system being connected to the electric drive motor,
  a regulating unit, which is provided with a transmitting and receiving device, said regulating unit being connected to the drive and control system for the regulation thereof, and
  a movement device for moving the material lying on the substrate as the vehicle moves,
at least one charging station for the vehicle, said charging station being located in the operating area and being provided with a charging system to charge the battery system of the vehicle,
a central operating system which is provided with a transmitting and receiving device which is designed to communicate with the transmitting and receiving device of the regulating unit of the vehicle,
wherein the central operating system is provided with a memory in which data are stored comprising navigation data, on the basis of which the vehicle is able to travel a predetermined route from a charging station through at least a part of the operating area and then back to this charging station, or possibly to a further charging station for the vehicle, and the central operating system is designed to transmit a packet of data comprising these navigation data from the transmitting and receiving device of the central operating system to the transmitting and receiving device of the regulating unit of the vehicle, and the regulating unit of the vehicle is provided with a memory for storing said packet of data, and the regulating unit of the vehicle is designed to regulate the drive and control system of the vehicle on the basis of said packet of data in order to enable the vehicle to travel along this predetermined route.

According to the invention, the farm-specific data are stored in the memory of the central operating system, i.e. not all farm-specific data are permanently stored in the memory of the regulating unit of the vehicle. The totality of farm-specific data required for the operation of the system is stored in memory of the central operating system. For example, if a second vehicle is added to the system, this second vehicle can simply be controlled on the basis of the same farm-specific data from the central operating system. As a result, the commissioning of a second vehicle is simple and fast. Furthermore, in the event of theft of a vehicle, it is an advantage that only a limited amount of data is stored in the memory of the regulating unit of the vehicle, so that the risk of confidential information relating to the farm falling into the wrong hands is reduced.

In addition, the transmitting and receiving device of the central operating system has a transmission range. Depending, for example, on the dimensions of the operating area of the farm, the locations of the charging station or charging stations and of the transmitting and receiving device of the central operating system in the operating area, communication between the transmitting and receiving device of the central operating system and the transmitting and receiving device of the regulating unit of the vehicle may be temporarily disrupted or even impossible. However, according to the invention, communication along the route is not necessary, since a packet of data is stored in the memory of the regulating unit comprising navigation data on the basis of which the vehicle is able to travel the entire predetermined route. The navigation data comprise, for example, a collection of different navigation instructions. The packet of data comprising the navigation data is transmitted to the transmitting and receiving device of the regulating unit of the vehicle while the transmitting and receiving device is located within the transmission range of the transmitting and receiving device of the central operating system and is connected thereto. The packet of data comprising the navigation data is stored in the memory of the regulating unit, so that the vehicle can then travel the required route autonomously without further communication with the central operating unit.

According to the invention, the central operating system is preferably designed to transmit a further packet of data from the transmitting and receiving device of the central operating system to the transmitting and receiving device of the regulating unit of the vehicle after the vehicle has returned to a charging station. On the basis of said further packet of data, the regulating unit of the vehicle then regulates the drive and control system of the vehicle once more to travel a subsequent route.

It is noted that a feed system for feeding animals is known from WO 2008/097080. This feed system comprises an autonomous feed vehicle and a store with a plurality of silos of different types of feed. The system is designed to deliver feed to cows which, for example, are standing at a feeding rack in a livestock building. A trolley with a grabber receives the instruction via a central operating system to grab a determined quantity of feed from a determined silo. After grabbing a quantity of feed, the grabber holds the feed tightly while the trolley moves to a filling station, where the feed vehicle stands ready. The grabber drops the quantity of feed at the filling station into the feed vehicle, after which the feed is released into the feed vehicle. The grabber then brings a second quantity of feed from a predetermined silo into the feed vehicle, where it is mixed with the feed which is already located in the feed vehicle. This is repeated until the required quantity of feed in the required composition is present in the feed vehicle. The feed vehicle then leaves the filling station and travels to the livestock building, after which the feed is released from the feed vehicle at the feeding rack. The autonomous feed vehicle can find its way by means of guides, markers or sensors. However, it is similarly necessary for this purpose that the data relating to all markers, together with the associated object or travel path and the dimensions thereof have been entered into an operating unit on board the feed vehicle. The aforementioned disadvantages of the feed vehicle according to EP 0739161 are also applicable here. If the vehicle has to be replaced with a replacement vehicle, for example in the event of a fault or theft, the replacement vehicle must be programmed once more with the farm-specific data. Also, if an additional vehicle needs be used, the farm-specific data must be programmed once more into the additional vehicle. In the event of theft of the vehicle, the risk also exists of confidential business information relating to the farm falling into the wrong hands from the memory of the vehicle. Furthermore, according to this document, control by means of GPS is also possible. However, navigation of the vehicle on the basis of GPS results in connection problems, particularly within a livestock building, as a result of which the vehicle can no longer continue to travel autonomously.

It is furthermore noted that a dairy farm system is known from WO 2007/071406, wherein a feed vehicle is suspended on a rail which is fitted to the ceiling of a milking stall. The feed vehicle moves automatically between a first station and a number of second stations. The first station forms a charging station in which the battery of the feed vehicle is charged, and/or a filling station for filling the feed vehicle. The second stations are feeding stations for the delivery of feed to cows. In this document, it is described as the prior art that the feed vehicle in the charging station is connected via an infrared connection to a network to receive feeding instructions. Given that the feed vehicle is guided by the rails, the route to the feeding stations is given by the rails and no navigation instructions are needed to travel this route. When the vehicle leaves from the charging station, the infrared connection is interrupted, and when the feed vehicle returns to the charging station after feeding, the infrared connection can be restored. In this document, it is described as a disadvantage that the infrared connection does not always function well and that the infrared connection can be established only if the feed vehicle is parked in the charging station. If the feed vehicle stops at a different station, for example during feeding, no communication with the feed vehicle is possible. As a solution, this document teaches that the feed vehicle is continuously connected to the network via a Bluetooth connection. The present invention therefore contradicts the teaching of this document: in contrast to the teaching of this document, the system according to the invention is designed precisely in such a way that the connection between the vehicle and the central operating unit can be dispensed with. After the packet of navigation data has been transmitted to the vehicle according to the invention, communication with the central operating unit is no longer required until the vehicle has reached the destination. This results in a high level of safety and reliability of the system according to the invention.

The operating area advantageously comprises a livestock building, in which preferably at least one charging station (11) for the vehicle (3) is disposed, wherein the livestock building comprises the substrate with a substantially flat floor on which the material is located, for example feed and/or manure, and wherein the movement device of the vehicle (3) is designed to shift the material lying on the substrate over the floor as the vehicle (3) moves. According to the invention, the vehicle can be designed in different ways and can perform different functions. For example, the vehicle according to the invention is designed as a feed-moving vehicle, or as manure-moving vehicle or manure-removing vehicle for use in a livestock building with animals, in particular dairy animals.

A fast removal of manure from the livestock building is important for the well-being and health of dairy animals, which affects the quality of the produced milk. Manure on livestock building floors is often a source of contamination for major claw diseases. Dairy animals with claw diseases produce less milk, walk badly and are less quickly identified as estrous. Furthermore, damp manure accumulations on the livestock building floors form sources of contamination which directly impact on the quality of the milk. As the vehicle according to the invention is designed for the removal of manure from the livestock building, at least one charging station for the vehicle is disposed in the livestock building, and the movement device of the vehicle is designed to shift the manure over the floor as the vehicle moves over the floor.

According to the invention, it is possible that the floor comprises a grid floor with openings in which manure is located, wherein a manure storage space is located under the grid floor, and wherein the movement device of the vehicle is provided with a pushing element to shift the manure over the floor as the vehicle moves over the floor in such a way that this manure falls through the openings of the grid floor into the manure storage space. In this case, the grid floor is kept clean by the vehicle by pushing the manure present thereon through the openings of the grid floor. Furthermore, the vehicle can also be used with closed floors, whereby manure present thereon is then swept away by the pushing element of the vehicle.

Instead of cleaning the livestock building floor by shifting manure, it is also possible for the manure to be removed from the floor, for example by vacuuming or scooping up the manure from the floor. In this case, the vehicle can comprise a manure storage tank in which the manure removed from the floor is stored. The manure storage tank is, for example, periodically emptied outside the livestock building.

The vehicle can also be designed to move feed over the livestock building floor. The livestock building comprises, for example, at least one feedway which is limited on at least one side by a feeding rack, wherein, seen from the feedway, standing stations for animals, preferably dairy animals, are provided behind the feeding rack, and wherein the data stored in the memory of the central operating system comprise navigation data, on the basis of which the vehicle is able to travel a route from a charging station to the feedway and at least partially through the feedway and then back to the charging station, or possibly to a further charging station for the vehicle. The predetermined route of the vehicle comprises at least a part of the feedway through the livestock building. As the vehicle moves through the feedway, the feed present on the floor, for example straw or hay, can be pushed by the pushing element of the vehicle to the feeding rack. The animals stand in the standing station behind the feeding rack with their heads toward the feedway and can reach the pushed feed.

In one embodiment, the system comprises a plurality of feedways, each being limited on at least one side by a feeding rack, wherein, seen from the feedway, standing stations are provided behind the feeding rack for animals, and wherein the data stored in the memory of the central operating system comprise navigation data, on the basis of which the vehicle is able to travel a route from at least one charging station in each case to at least one of the feedways and at least partially through the feedway or feedways and then back to this charging station, or possibly to a further charging station for the vehicle, and wherein at least one of the feedways can be selected in the central operating system, and wherein the central operating system is designed to determine a packet of data from the data stored in the memory of the central operating system in such a way that said packet of data is provided with navigation data, on the basis of which the vehicle is able to travel a route from a charging station to the selected feedway or feedways and at least partially through this selected feedway or feedways and then back to this charging station, or possibly to a further charging station for the vehicle, and wherein the central operating system is designed to transmit said packet of data from the transmitting and receiving device of the central operating system to the transmitting and receiving device of the regulating unit of the vehicle.

In this case, a user can select one or more feedways of the livestock building in the central operating system. The feedways are located in the livestock building at a distance from one another. The feedways run, for example, substantially parallel to one another. On the basis of the selected feedway or feedways, the central operating system determines the packet of data, i.e. a partial collection of specific navigation data from the collection of all navigation data stored in the memory of the central operating system, for example by combining specific navigation data to form the packet of data or by selecting the packet of data from packets of data previously stored in the memory of the central operating system. The central operating system then sends only said packet of data via the transmitting and receiving devices to the regulating unit of the vehicle. On the basis of said packet of data, the vehicle travels autonomously to the one or more selected feedways and back again to a charging station. Once the vehicle has returned to the charging station, the central operating system can transmit a following packet of data which corresponds to one or more further selected feedways to the regulating unit of the vehicle. On the basis thereof, the vehicle again travels autonomously to the one or more further selected feedways. Only at most one packet of data is therefore ever stored in the memory of the regulating unit, with which the vehicle can travel from the charging station to the one or more selected feedways and back again to a charging station.

In one embodiment according to the invention, the system comprises:
a second self-propelled vehicle, which is provided with:
    a plurality of wheels, which are movable over the substrate,
    a drive and control system for driving and controlling the second vehicle, said drive and control system of the second vehicle being provided with an electric drive motor and a battery system for storing electrical energy, said battery system being connected to the electric drive motor, and said battery system being chargeable by the charging system,
    a regulating unit, which is provided with a transmitting and receiving device, said regulating unit being connected to the drive and control system for the regulation thereof,
wherein the transmitting and receiving device of the central operating system is designed to communicate with the transmitting and receiving device of the regulating unit of the second vehicle, and
wherein data are stored in the memory of the central operating system, comprising navigation data, on the basis of which the second vehicle is able to travel a predetermined route from a charging station through at least a part of the operating area and then back to this charging station, or possibly a further charging station, and the central operating system is designed to transmit a packet of data comprising these navigation data from the transmitting and receiving device of the central operating system to the transmitting and receiving device of the regulating unit of the second vehicle, and the regulating unit of the second vehicle is provided with a memory for storing said packet of data, and the regulating unit of the second vehicle is designed to regulate the drive and control system of the second vehicle on the basis of said packet of data in order to enable the second vehicle to travel along the predetermined route.

In this case, the system comprises two or more vehicles, which are each controlled from the central operating system, in each case by transmitting a packet of data comprising navigation data to this vehicle, with which the vehicles can in each case autonomously travel the required route. If a plurality of vehicles are used, a plurality of charging stations should preferably also be provided, for example at least one charging station per vehicle.

According to the invention, the second vehicle can similarly be designed in different ways and can perform different functions. For example, the second vehicle according to the invention is designed as a feed-moving vehicle, or as manure-moving vehicle or manure-removing vehicle, or as a feed vehicle for use in a livestock building with animals, in particular dairy animals.

If the second vehicle is designed as a feed vehicle, this feed vehicle according to invention may comprise:
a container to hold feed,
a delivery device to deliver feed held in the container, and
    the system is provided with:
    a feed stock system to contain at least one type of feed,
    a feed-loading station for the feed vehicle, said feed-loading station being located in the operating area, a feed-loading device which is designed to transfer feed from the feed stock system to the container of the feed vehicle when the feed vehicle is set up on the feed-loading station, a feeding station for feeding animals, said feeding station being located in the operating area at a distance from the feed-loading station, and said feeding station being reachable for the feed vehicle from the feed-loading station by moving the feed vehicle with the wheels thereof over the substrate, and wherein data are stored in a memory of the central operating system, comprising navigation data, on the basis of which the vehicle is able to travel a predetermined route from the feed-loading station, which is preferably provided with a charging station for the feed vehicle, to the feeding station, and the central operating system is designed to transmit a packet of data comprising these navigation data from the transmitting and receiving device of the central operating system to the transmitting and receiving device of the regulating unit of the feed vehicle, and the regulating unit of the vehicle is provided with a memory for storing said packet of data, and the regulating unit of the feed vehicle is designed to regulate the drive and control system of the feed vehicle on the basis of said packet of data in order to enable the feed vehicle to travel along the predetermined route from the feed-loading station to the feeding station.

In one embodiment of the invention, the data which are stored in the memory of the central operating system comprise navigation data, on the basis of which the feed vehicle is able to travel an entire route from the feed-loading station to the feeding station and back to the feed-loading station. The packet of data which is transmitted from the transmitting and receiving device of the central operating system to the transmitting and receiving device of the regulating unit of the feed vehicle and is stored in the memory of the regulating unit of the feed vehicle comprises these navigation data. The regulating unit of the feed vehicle is designed to regulate the drive and control system of the feed vehicle on the basis of said packet of data in order to enable the feed vehicle to travel from the feed-loading station to the feeding station and back. The regulating unit of the feed vehicle can therefore regulate the drive and control system of the feed vehicle on the basis of the received packet of data in such a way that the feed vehicle can also travel back to the feed-loading station without communication with the central operating unit. The central operating system is preferably designed to transmit a further packet of data from the transmitting and receiving device of the central operating system to the transmitting and receiving device of the regulating unit of the feed vehicle after the feed vehicle has returned to the feed-loading station. On the basis of said further packet of data, the regulating unit of the feed vehicle then regulates the drive and control system of the feed vehicle once more.

In one preferred embodiment, the feed system is provided with a plurality of feeding stations, wherein the data stored in the memory of the central operating system comprises navigation data, on the basis of which the feed vehicle is able to travel an entire route from the feed-loading station in each case to at least one of the feeding stations and possibly back to the feed-loading station, and wherein at least one of the feeding stations can be selected in the central operating system, and wherein the central operating system is designed to determine a packet of data from the data stored in the memory of the central operating system in such a way that said packet of data is provided with navigation data, on the basis of which the feed vehicle is able to travel an entire route from the feed-loading station to the selected feeding station or feeding stations and possibly back to the feed-loading station, and wherein the central operating system is designed to transmit said packet of data from the transmitting and receiving device of the central operating system to the transmitting and receiving device of the regulating unit of the feed vehicle, and the regulating unit of the feed vehicle is designed to store said packet of data in the memory of the regulating unit, and the regulating unit of the feed vehicle is designed to regulate the drive and control system of the feed vehicle on the basis of said packet of navigation data in order to enable the feed vehicle to travel from the feed-loading station to the selected feeding station or feeding stations and possibly back to the feed-loading station.

In this case, a user can select one or more feeding stations in the central operating system. The feeding stations are located in the operating area at a distance from one another. On the basis of the selected feeding station or feeding stations, the central operating system determines the packet of data, i.e. a partial collection of specific navigation data from the collection of all navigation data stored in the memory of the central operating system, for example by combining specific navigation data to form the packet of data or by selecting the packet of data from packets of data previously stored in the memory of the central operating system. The central operating system then sends only said packet of data via the transmitting and receiving devices to the regulating unit of the feed vehicle. On the basis of said packet of data, the feed vehicle travels autonomously to the one or more selected feeding stations and possibly back again to the feed-loading station. Once the feed vehicle has returned to the feed-loading station, the central operating system can send a following packet of data which corresponds to one or more further selected feeding stations to the regulating unit of the feed vehicle. On the basis thereof, the feed vehicle again travels autonomously to the one or more further selected feeding stations. Only at most one packet of data is therefore ever stored in the memory of the regulating unit, with which the feed vehicle can travel from the feed-loading station to the one or more selected feeding stations and back again to the feed-loading station.

It is possible according to the invention for the feed system to be provided with a plurality of feedways, each comprising at least one feeding station for feeding the animals. The feedways are located in the operating area at a distance from one another. The feedways run, for example, substantially parallel to one another. One or more feeding stations for feeding the animals are disposed along each feedway. A user can select one or more feedways in the central operating system. On the basis of the selected feedway or feedways, the central operating system determines the packet of data which the central operating system sends to the regulating unit of the feed vehicle. On the basis of said packet of data, the feed vehicle travels autonomously to the one or more selected feedways along the feeding stations thereof and possibly back again to the feed-loading station. Once the feed vehicle has returned to the feed-loading station, the central operating system can transmit a following packet of data which corresponds to one or more further selected feedways to the regulating unit of the feed vehicle. On the basis thereof, the feed vehicle again travels autonomously to the one or more further selected feedways.

In one embodiment, the feeding station or feeding stations is/are disposed in a livestock building, for example along the feedway or feedways, wherein the livestock building is provided with a livestock building door which is drivable by a motor between an open position, in which the feed vehicle can enter the livestock building, and a closed position, in which the livestock building is closed by the livestock building door, and wherein the motor of the livestock building door is provided with a transmitting and receiving device which is designed to communicate, preferably wirelessly, with the transmitting and receiving device of the regulating unit of the feed vehicle. The data stored in the memory of the central operating system comprise operating data to operate the livestock building door. The packet of data which is transmitted from the transmitting and receiving device of the central operating system to the transmitting and receiving device of the regulating unit of the feed vehicle and is stored in the memory of the regulating unit of the feed vehicle comprises these operating data. In other words, the operating data for operating the livestock building door are sent along with the packet of data. The regulating unit of the feed vehicle is designed to transmit the operating data from the transmitting and receiving device of the regulating unit of the feed vehicle to the transmitting and receiving device of the motor of the livestock building door to operate the livestock building door, in particular to open the livestock building door when the feed vehicle is located in front of the livestock building door in the closed position. The livestock building door can therefore be opened through communication between the transmitting and receiving devices of the motor of the livestock building door and the regulating unit of the feed vehicle without intervention of the central operating system. As a result, the livestock building door can be located without problems outside the transmission range of the transmitting and receiving device of the central operating system.

In a preferred embodiment according to the invention, the feed stock system is designed to contain a plurality of types of feed which are arranged separately from one another, wherein the data stored in the memory of the central operating system comprise a plurality of rations for the animals, each comprising ration data. One of the rations can be selected in the central operating system. The central operating system is designed to transmit ration data of the selected rations together with the packet of navigation data from the transmitting and receiving device of the central operating system to the transmitting and receiving device of the regulating unit of the feed vehicle. In other words, the packet of data which is transmitted to the regulating unit of the feed vehicle comprises the ration data. The packet of navigation data and ration data, and possibly further data, such as operating data, is stored in the memory of the regulating unit of the feed vehicle. The regulating unit of the feed vehicle is designed to regulate the feed-loading device on the basis of the ration data of the selected ration in such a way that the selected ration is disposed in the container of the feed vehicle.

The feed stock system comprises, for example, a feed kitchen. The plurality of types of feed can be disposed separately from one another on the substrate, such as grass (silage), maize, hay, potato pulp, etc., and any given combination thereof. The rations and the associated ration data for the animals are stored in the memory of the central operating system. Following the selection of a specific ration, the ration data of said selected ration are transmitted from the central operating system to the regulating unit of the feed vehicle. The regulating unit of the feed vehicle then forwards these ration data to the feed-loading device. At first glance, it appears to some extent laborious not to forward the ration data directly from the central operating system to the feed-loading device, but via the regulating unit of the feed vehicle. However, this has the advantage that possible connection problems between the central operating system and the feed-loading device are irrelevant, while the risk of connection problems between the regulating unit of the feed vehicle and the feed-loading device is minimal if the feed vehicle is set up on the feed-loading station. This guarantees that the ration data are reliably forwarded. Furthermore, it is also possible according to the invention for the ration data to be sent directly from the central operating system to the feed-loading device, without intervention from the regulating unit of the feed vehicle, for example if the central operating system is disposed close to the feed-loading device.

It is possible for the feed-loading device to be provided with a transmitting and receiving device which is designed to communicate, preferably wirelessly, with the transmitting and receiving device of the regulating unit of the feed vehicle, wherein the regulating unit of the feed vehicle is designed to transmit the ration data of the selected ration from the transmitting and receiving device of the regulating unit of the feed vehicle to the transmitting and receiving device of the feed-loading device, and wherein the feed-loading device is designed to transfer quantities of the types of feed from the feed stock system to the container of the feed vehicle on the basis of the ration data of the selected ration in such a way that the selected ration is held in the container.

The feed-loading device comprises, for example, a movable grabber which in each case can pick up a quantity of feed of a specific type and transfer it to the container of the feed vehicle. However, it is also possible according to the invention for the feed vehicle to comprise the feed-loading device. If the feed-loading device forms part of the feed vehicle, the plurality of types of feed are for example, disposed on the substrate to form the feed stock system, and the feed-loading station can extend over an area which overlaps with the substrate of the feed stock system. In addition to the ration data, the packet of data may comprise further ration data, on the basis of which the feed vehicle is able to travel within the area of the feed-loading station to the plurality of types of feed. By means of the traveling to the plurality of types of feed and the picking up of quantities of feed with the integrated feed-loading device of the feed vehicle, the selected ration is held in the container of the feed vehicle.

It is possible according to the invention for the feed-loading station to be provided with the charging system for charging the battery system of the feed vehicle. In this case, the feed-loading station forms a charging station for charging the battery system of the feed vehicle. The battery system is therefore charged while the container of the feed vehicle is loaded with feed. Given that the loading with feed takes time, it is advantageous to use this time to charge the battery system.

In one embodiment of the invention, the feed vehicle is provided with a mixing device to mix the feed held in the container, wherein the regulating unit of the feed vehicle is designed to regulate the mixing device in such a way that the mixing device mixes the feed held in the container while the battery system of the feed vehicle is charged by means of the charging system of the feed vehicle. Given that the mixing of the feed held in the container consumes a relatively large amount of energy, it is favorable to carry out the mixing while the battery system is connected to the power supply network. When the feed vehicle moves away from the feed-loading station, the charge level of the battery system is sufficiently high to travel to the feeding station and possibly back.

It is preferable according to the invention for the operating area of the system to be provided with a plurality of markers, wherein the vehicle and/or the second vehicle is provided with a sensor system to detect the markers, and wherein the navigation data stored in the memory of the central operating system comprise marker data of the markers, and wherein the navigation data of the packet of data are provided with these marker data, and wherein the regulating unit of the vehicle and/or of the second vehicle is designed to regulate the drive and control system of this vehicle on the basis of these marker data and the detections of the sensor system. The markers are disposed at a fixed position in the operating area of the feed system, for example in the livestock building. The navigation data in the packet of data which are sent by the central operating system to the regulating unit of the vehicle and/or the second vehicle comprise the marker data. On the basis of said packet of data and by means of the sensor system of the vehicle and/or the second vehicle and the markers in the operating area, the regulating unit can enable the vehicle and/or the second vehicle to travel the required route.

It is possible according to the invention for the markers to be provided with a strip, disposed in or on the substrate, a wall and/or an impact point, wherein the marker data of the navigation data of the packet of data comprise the following of the strip by means of the sensor system of the vehicle and/or for the second vehicle and/or the following of the wall by means of the sensor system of the vehicle and/or of the second vehicle and/or the traveling against an impact point which is detectable by the sensor system of the vehicle and/or of the second vehicle. The vehicle and/or the second vehicle may also comprise a gyroscope, wherein the navigation data comprise the traveling of the vehicle and/or the second vehicle straight ahead over a predetermined distance on the basis of the gyroscope. There are obviously also other possibilities for enabling the vehicle and/or the second vehicle according to the invention to find its way.

It is preferable according to the invention for the central operating system to be designed to transmit the packet of data from the transmitting and receiving device of the central operating system to the transmitting and receiving device of the regulating unit of the vehicle and/or of the second vehicle while this vehicle is set up on a charging station. The packet of data is received by the transmitting and receiving device of the regulating unit and is stored in the memory of the regulating unit before the vehicle concerned sets off from the feed-loading station to travel the predetermined route away. If the transmitting and receiving device of the central operating unit is disposed in such a way that the charging station is located within the transmission range, the connection between the transmitting and receiving devices of the central operating unit and the regulating unit of the vehicle is guaranteed as long as the vehicle is set up on the charging station. It is favorable in terms of reliability to then transfer the packet of data.

It is possible according to the invention for the central operating system to be designed for transmitting the packet of data in one step from the transmitting and receiving device of the central operating system to the transmitting and receiving device of the regulating unit of the vehicle. In this case, the entire packet of data is sent in one step, i.e. at a single time or within a short time period, such as within a time period of less than 1 second, for example by means of a single signal, from the transmitting and receiving device of the central operating system to the transmitting and receiving device of the regulating unit of the vehicle. Furthermore, it is obviously also possible for the entire packet of data to be transmitted in partial packets in the form of consecutive signals within a short time period, such as within a time period of less than 30 seconds or less than 10 seconds, preferably less than 1 second.

In one embodiment according to the invention, the data stored in the memory of the central operating system comprise operating data for operating the delivery device of the feed vehicle, wherein the packet of data is provided with these operating data, and wherein the regulating unit of the feed vehicle is designed to operate the delivery device of the feed vehicle on the basis of these operating data. If the packet of data comprises operating data for operating the delivery device, the delivery device of the feed vehicle can deliver the feed from the container of the feed vehicle at the right time and at the right feeding station.

The invention also relates to a method for feeding animals, using a system as described above, wherein the central operating system transmits the packet of data from the transmitting and receiving device of the central operating system to the transmitting and receiving device of the regulating unit of the vehicle and/or of the second vehicle, and the regulating unit of the vehicle and/or of the second vehicle regulates the drive and control system of this vehicle on the basis of said packet of data in order to enable this vehicle to travel along this predetermined route.

Here, it is preferable for the data stored in the memory of the central operating system to comprise navigation data, on the basis of which the vehicle and/or the second vehicle is able to travel this predetermined route from a charging station through at least a part of the operating area and then back to this charging station or possibly to a further charging station, wherein the packet of data is provided with these navigation data, and the regulating unit of the vehicle and/or of the second vehicle regulates the drive and control system of this vehicle on the basis of said packet of data in order to enable this vehicle to travel along this predetermined route, and wherein, after this vehicle has returned to a charging station, the central operating system transmits a further packet of data from the transmitting and receiving device of the central operating system to the transmitting and receiving device of the regulating unit of this vehicle, and wherein the regulating unit of this vehicle regulates the drive and control system of this vehicle on the basis of said further packet of data. The further packet of data comprises, for example, further navigation data in order to enable the vehicle and/or the second vehicle to travel along the same route or a different route. Furthermore, in a feed vehicle, the further packet of data may comprise further ration data for the delivery of a selected ration. The feed-loading device can then be controlled once more by the regulating unit of the feed vehicle as described above.

The invention will now be explained in detail with reference to an example embodiment shown in the drawing.

Figure 1:
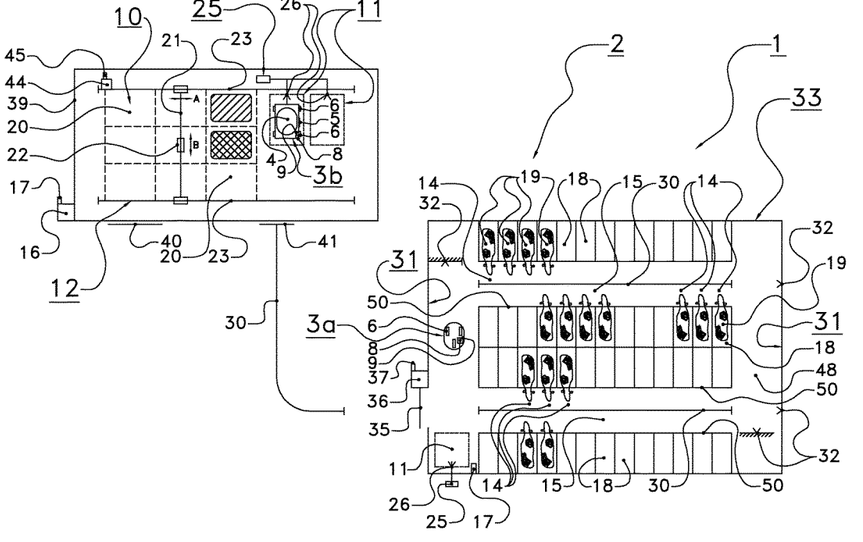
The FIGURE shows a schematic top view of a system for performing an animal-related action according to the invention.

In the FIGURE, the system for performing an animal-related action is denoted as a whole by 1. The system 1 comprises an operating area 2 with a substrate. In this example embodiment, a feed stock system 10 and a livestock building 33 are located in the operating area. Obviously, a dwelling, one or more further livestock buildings, sheds and other buildings (not shown) may also be located in the operating area.

In this example embodiment, the system 1 comprises two self-propelled vehicles 3a, 3b. It is obviously possible according to the invention for the system 1 to comprise only one self-propelled vehicle or more than two self-propelled vehicles. In this example embodiment, the two self-propelled vehicles 3a, 3b are designed as a feed-moving vehicle 3a and a feed vehicle 3b.

The self-propelled vehicle 3b is movable with wheels 6 over the substrate of the operating area. The feed vehicle 3b comprises a container 4 to hold feed and a mixing device to mix said feed (not shown). A delivery device 5 is provided to deliver the feed from the container 4. The feed vehicle 3b is movable by means of a drive and control system for driving and controlling the feed vehicle (not shown). The drive and control system of the feed vehicle 3b is regulatable by a regulating unit 8 of the feed vehicle 3b. In this example embodiment, the drive and control system comprises an electric drive motor in each case for each wheel 6 (not shown). The electric drive motors of the wheels 6 are regulatable independently from one another. Through the regulation of the speed of rotation of the wheels 6, the feed vehicle 3b can travel in a straight line forwards, in a straight line backwards, or in a curve.

The drive and control system comprises a battery system for storing electrical energy (not shown). The battery system is connected to the electric drive motors. In the FIGURE, the feed vehicle 3b is set up on a feed-loading station 11, in which the container 4 of the feed vehicle 3b is filled with feed. The feed-loading station 11 comprises a charging point 26 of a charging system 25 for charging the battery system of the feed vehicle 3b. The feed-loading station 11 therefore also forms a charging station. The regulating unit 8 of the feed vehicle 3b is designed to regulate the mixing device in such a way that the mixing device mixes the feed held in the container 4 while the feed vehicle 3b is connected to the charging point 26 and the battery system of the feed vehicle 3b is charged by means of the charging system 25.

In this example embodiment, the feed stock system 10 comprises a feed kitchen. The feed kitchen comprises a number of compartments 20 on the substrate, in which different types of feed are arranged separately from one another. Obviously, the feed stock system 10 can also be designed differently. A feed-loading device 12 is provided to transfer feed from the feed stock system 10 to the container 4 of the feed vehicle 3b when the feed vehicle 3b is set up on the feed-loading station 11.

In this example embodiment, the feed-loading device 12 comprises a movable support rail 21 which is movably (see arrow A) disposed on two fixed support rails 23 which are disposed parallel to one another and at a distance from one another. The movable support rail 21 comprises a trolley 22 movable along said rail (see arrow B), so that the trolley 22 can be positioned above each of the compartments 20 with types of feed.

The trolley 22 is provided with a vertically movable grabber (not shown) to grab feed from the compartments 20. Said feed can then be moved to above the container 4 of the feed vehicle 3b and can then be released by the grabber. Due to the transfer of a plurality of types of feed to the container 4 of the feed vehicle 3b, a mixture occurs therein for feed types. The feed-loading device 12 comprises an operating unit 44.

Furthermore, the feed-loading device 12 could also be integrated with the feed vehicle 3b. In this case, the feed vehicle 3b travels to the required compartments 20 with feed types, and the feed-loading device of the feed vehicle 3b loads the container 4 with feed in the required quantity and composition.

The feed stock system 10 is surrounded by a safety fence 39. An entrance door 40 is disposed in the safety fence 39, so that a fork-lift truck or the like can enter the feed stock system 10 via the entrance door 40 to top up the compartments 20 with types of feed. In addition, the safety fence 39 comprises a passage door for the feed vehicle 3b. The feed vehicle 3b can travel in and out of the feed stock system 10 via the passage door 41.

The livestock building 33 comprises a livestock building door 35 which is drivable by a motor 36 between an open position, in which the feed vehicle 3b can enter the livestock building 33, and a closed position, in which the livestock building 33 is closed by the livestock building door 35. In this example embodiment, the livestock building 33 has two feedways 15. More or fewer feedways can obviously be provided. In this example embodiment, each feedway 15 is limited on both sides by a feeding rack 50. Each feedway 15 comprises a plurality of feeding stations 14 for feeding the animals 19. The feeding stations 14 are located along standing stations 18 for the animals 19, which, seen from the feedway 15, are located behind the feeding rack 50. The standing stations 19 extend substantially crosswise in relation to the feedway 15. The animals 19 stand with their heads toward the feedway 15 and can place their heads through the feeding rack 50 to reach the feeding station 14 of the feedway 15.

The feeding stations 14 in the livestock building 33 are located at a distance from the feed-loading station 11 inside the feed stock system 10. The feeding stations 14 are reachable from the feed-loading station by moving the feed vehicle 3b with the wheels 6 thereof over the substrate. Different markers are disposed in the operating area 2. In this example embodiment, the markers are formed by strips 30 disposed in or on the substrate, walls 31 of the livestock building 33 and impact points 32. The feed vehicle 3b comprises a sensor system (not shown), which is designed to interwork with the markers 30, 31, 32. In addition, the feed vehicle 3b comprises a gyroscope (not shown) in order to travel straight ahead over a predefined distance. The gyroscope is connected to the regulating unit 8 of the feed vehicle 3b.

The regulating unit 8 of the feed vehicle 3b comprises a transmitting and receiving device 9. Furthermore, a central operating system 16 is provided, which comprises a transmitting and receiving device 17 which is designed to communicate wirelessly with the transmitting and receiving device 9 of the regulating unit 8 of the feed vehicle 3b, for example via Bluetooth. Although the central operating system 16 is drawn on the left in the FIGURE, the central operating system 16 could also be disposed at a different location. In addition, the central operating system 16 in this example embodiment comprises an additional transmitting and receiving device 17, which is disposed in the livestock building 33. In this example embodiment, it is important that the central operating system 16 is connected to the regulating unit 8 of the feed vehicle 3b when the feed vehicle 3b is set up on the feed-loading station 11.

The feed-loading device 12 is similarly provided with a transmitting and receiving device 45, which is designed to communicate wirelessly with the transmitting and receiving device 9 of the regulating unit 8 of the feed vehicle 3b. Furthermore, the motor 36 of the livestock building door 35 comprises a transmitting and receiving device 37, which is designed to communicate wirelessly with the transmitting and receiving device 9 of the regulating unit 8 of the feed vehicle 3b.

The central operating system 16 is provided with a memory in which data are stored. The data stored in the memory of the central operating system 16 comprise navigation data, ration data and operating data. The navigation data comprise marker data of markers 30, 31, 32. On the basis of the navigation data, the feed vehicle 3b is able to travel different routes, for example a first route from the feed-loading station 11 to the uppermost feedway 15 shown in the FIGURE, back and forth through the feedway 15 and back to the feed-loading station 11, and a second route from the feed-loading station 11 to the lowermost feedway 15 shown in the FIGURE, through this feedway 15 and back to the feed-loading position 11. Further routes can obviously be traveled with the navigation data, for example a third route from the feed-loading station 11 to the livestock building 33, through both feedways 15, possibly via the path 48 along the rear wall 31 and back to the feed-loading station 11.

The rations stored in the memory of the central operating system comprise a plurality of rations for the animals. Each ration is determined by a total quantity of feed and the composition thereof, for example the total quantity of feed in kg and the recipe (ratio) or the number of kg per feed type.

The operating data comprise, for example, operating data for operating the delivery device 5 of the feed vehicle 3b and operating data for operating the livestock building door 35. In addition, the data stored in the memory of the central operating system 16 may, in this example embodiment, also comprise operating data for operating the passage door 41 of the safety fence 39.

The central operating system 16 comprises an input with which one of the rations and at least one of the feedways 15 can be selected in the central operating system 16. Depending on the input, the central operating system 16 determines a packet of data from the data stored in the memory of the central operating system 16.

For example, the central operating system 16 selects a partial collection of ration data from all ration data on the basis of the selected ration, wherein the partial collection of ration data is added to the packet of data. Furthermore, the central operating system 16 can select a partial collection of navigation data from all navigation data on the basis of the selected feedway or feedways and can add it to the packet of data. In this way, the packet of data is composed on the basis of the input. As an alternative, predetermined packets of data can be stored in the memory of the central operating system 16, and the central operating system 16 selects one of these packets of data on the basis of the input.

The central operating system 16 is designed to transmit said packet of data from the transmitting and receiving device 17 of the central operating system 16 to the transmitting and receiving device 9 of the regulating unit 8 of the feed vehicle 3b while the feed vehicle 3b is set up on the feed-loading station 11. The packet of data is transferred in one step, i.e. at a single time or within a short time period, such as within a time period of less than 1 second, for example by means of a single signal. The regulating unit 8 of the feed vehicle 3b comprises a memory in which said packet of data is stored. No more than the packet of data which is determined by the central operating system 16 on the basis of the input is therefore stored in the memory of the regulating unit 8 of the feed vehicle 3b.

The regulating unit 8 of the feed vehicle 3b is designed to regulate the feed-loading device 12 on the basis of the ration data of the selected ration so that the selected ration is disposed in the container 4 of the feed vehicle 3b while the feed vehicle 3b is set up on the feed-loading station 11. To do this, the regulating unit 8 of the feed vehicle 3b sends the ration data of the selected ration from the transmitting and receiving device 9 of the regulating unit 8 of the feed vehicle 3b to the transmitting and receiving device 45 of the feed-loading device 12. On the basis of the ration data of the selected ration, the feed-loading device 12 brings quantities of the types of feed from the compartments 20 to the container 4 of the feed vehicle 3b so that the selected ration is held in the container 4.

After the container 4 has been filled with the selected ration and is mixed on the feed-loading station 11, the regulating unit 8 of the feed vehicle 3b regulates the drive and control system of the feed vehicle 3b on the basis of the packet of data in order to enable the feed vehicle 3b to travel from the feed-loading station 11 to the selected feedway 15 or feedways 15. The feed vehicle 3b therefore travels autonomously on the basis of the packet of data stored in the memory of the regulating unit 8 of the feed vehicle 3b to the selected feedway 15 or feedways 15. Said packet of data at any rate comprises navigation data, on the basis of which the feed vehicle 3b is able to travel a route from the feed-loading station 11 to the selected feedway 15 or feedways 15. In this example embodiment, the navigation data in the packet of data comprise the marker data of the markers 30, 31, 32, with which the feed vehicle 3b can find its way by means of the sensor system. On the basis of the packet of data, the feed vehicle 3b can furthermore travel autonomously through this selected feedway 15 or feedways 15, possibly via the path 48, and then back to the feed-loading station 11.

In order to gain access to the livestock building 33, the packet of data comprises operating data for operating the livestock building door 35. The regulating unit 8 of the feed vehicle 3b sends these operating data from the transmitting and receiving device 9 of the regulating unit 8 of the feed vehicle 3b to the transmitting and receiving device 37 of the motor 36 of the livestock building door 35 to open the livestock building door 35 when the feed vehicle 3b is standing in front of a closed livestock building door 35. Furthermore, the passage door 41 can be operable in the same way, so that the feed vehicle 3b itself can communicate with the passage door 41 to open/close the latter if required.

In addition to the safety fence 39, the feed system 10 may comprise additional safety facilities, for example an emergency stop with which the feed vehicle 3b and/or the feed-loading system 12 are immediately stopped. An alarm, for example, can go off and/or a message can be sent to a user.

A second feed-loading station 11 for a second feed vehicle 3 is present along with the feed-loading station 11. In the system 1 according to the invention, two or more vehicles 3b can be used simultaneously (not shown). In this example embodiment, the system 1 comprises a second self-propelled vehicle which is designed as a feed-moving vehicle 3a.

The feed-moving vehicle 3a is located in the livestock building 33. Feed, for example hay, straw or grass, lies on the floor of the feedways 15. The feed-moving vehicle 3a comprises a movement device (not shown), which is designed to shift the feed over the livestock building floor when the feed-moving vehicle 3a travels through the feedway 15 in such a way that the feed is moved in the direction of the feeding rack 50.

The drive and operation of the feed-moving vehicle 3a is substantially carried out in the same way as in the case of the feed vehicle 3b. The feed-moving vehicle 3a is therefore movable with wheels 6 over the floor of the livestock building 33. The feed-moving vehicle 3a is movable by means of a drive and control system for driving and controlling the feed-moving vehicle 3a (not shown). The drive and control system of the feed-moving vehicle 3a is regulatable by a regulating unit 8 of the feed-moving vehicle 3a. In this example embodiment, the drive and control system comprises an electric drive motor in each case for each wheel 6 (not shown). The electric drive motors of the wheels 6 are regulatable independently from one another. Through the regulation of the speed of rotation of the wheels 6, the feed-moving vehicle 3a can travel in a straight line forwards, in a straight line backwards, or in a curve.

The drive and control system comprises a battery system for storing electrical energy (not shown). The battery system is connected to the electric drive motors. A charging station 11 for the feed-moving vehicle 3a, which is provided with a charging point 26 of the charging system 25 to charge the battery system of the feed-moving vehicle 3a, is located in the livestock building 33.

As described above, different markers are disposed in the livestock building 33. In this example embodiment, the markers in the livestock building 33 are formed by strips 30 disposed in or on the substrate, walls 31 of the livestock building 33 and impact points 32. The feed-moving vehicle 3a comprises a sensor system (not shown), which is designed to interwork with the markers 30, 31, 32. In addition, the feed-moving vehicle 3a comprises a gyroscope (not shown) in order to travel straight ahead over a predefined distance. The gyroscope is connected to the regulating unit 8 of the feed-moving vehicle 3a.

The regulating unit 8 of the feed-moving vehicle 3a comprises a transmitting and receiving device 9, which is designed to communicate wirelessly with the transmitting and receiving device 17 of the central operating system 16 in the livestock building 33, for example via Bluetooth. The central operating system 16 is connected to the regulating unit 8 of the feed-moving vehicle 3a when the feed-moving vehicle 3a is set up on the charging station 11 in the livestock building 33.

On the basis of the navigation data stored in the memory of the central operating system 16, the feed-moving vehicle 3a is able to travel different routes through the livestock building 33, for example a first route from the charging station 11 to the uppermost feedway 15 shown in the FIGURE, back and forth through this feedway 15 along the feeding racks 50 to press the feed on the floor of the livestock building 33 against the feeding rack 50 and back to the charging station 11, and a second route from the charging station 11 to the lowermost feedway 15 shown in the FIGURE, back and forth through this feedway 15 along the feeding racks to press the feed on the floor of the livestock building 33 against the feeding rack 50 and back to the charging station 11. Further routes can obviously be traveled with the navigation data, for example a third route from the charging station 11, through both feedways 15 along the feeding racks 50 to press the feed on the floor of the livestock building 33 against the feeding rack, possibly via the path 48 along the rear wall 31 and back to the charging station 11.

At least one of the feedways 15 can be selected in the central operating system 16 with the input of the central operating system 16. Depending on the input, the central operating system 16 determines a packet of data from the data stored in the memory of the central operating system 16. For example, the central operating system 16 selects a partial collection of navigation data from all navigation data on the basis of the selected feedway or feedways, wherein the partial collection of ration data is added to the packet of data. As an alternative, predetermined packets of data can be stored in the memory of the central operating system 16, and the central operating system 16 selects one of these packets of data on the basis of the input.

The central operating system 16 is designed to transmit said packet of data from the transmitting and receiving device 17 of the central operating system 16 to the transmitting and receiving device 9 of the regulating unit 8 of the feed-moving vehicle 3a while the feed-moving vehicle 3a is set up on the charging station 11 in the livestock building 33. The packet of data is transferred in one step, i.e. at a single time or within a short time period, such as within a time period of less than 1 second, for example by means of a single signal. The regulating unit 8 of the feed-moving vehicle 3a comprises a memory in which said packet of data is stored. No more than the packet of data which is determined by the central operating system 16 on the basis of the input is therefore stored in the memory of the regulating unit 8 of the feed-moving vehicle 3a.

The regulating unit 8 of the feed-moving vehicle 3a regulates the drive and control system of the feed-moving vehicle 3a on the basis of the packet of data in order to enable the feed-moving vehicle 3a to travel the required route. The feed-moving vehicle 3a therefore travels autonomously on the basis of the packet of data stored in the memory of the regulating unit 8 of the feed-moving vehicle 3a. In this example embodiment, the navigation data in the packet of data comprise the marker data of the markers 30, 31, 32 with which the feed-moving vehicle 3a can find its way by means of the sensor system.

The vehicle 3a can also be designed as a manure-moving vehicle or manure-removing vehicle rather than as a feed-moving vehicle (not shown). The livestock building floor comprises, for example, a grid floor with openings, on which manure is located, while a manure storage space is located under the grid floor (not shown). The vehicle 3a designed as a manure-moving vehicle comprises, for example, a pushing element for shifting the manure over the grid floor as the vehicle 3a moves over this grid floor in such a way that this manure falls through the openings of the grid floor into the manure storage space. As an alternative, the vehicle 3a designed as a manure-moving vehicle may comprise a manure storage tank, wherein the vehicle 3a is designed to move manure from the livestock building floor in the manure storage tank, preferably by vacuuming or scooping up the manure from the livestock building floor. Moreover, a manure-moving vehicle or manure-removing vehicle of this type can also be incorporated into the system as a further self-propelled vehicle together with the feed-moving vehicle and feed vehicle or feed vehicles. It is also possible for the system not to comprise a feed vehicle 3b, but rather one or more vehicles 3a, which are each designed as a feed-moving vehicle or as a manure-moving vehicle or manure-removing vehicle.

The invention is not limited to the example embodiment shown in the FIGURES. The person skilled in the article can make various modifications which fall within the scope of the invention.

The invention claimed is:
1. A system for performing an animal related action, said system comprising:
 an operating area with a substrate on which material lies;
 a self-propelled vehicle, which is provided with:
  a plurality of wheels, which are movable over the substrate;

a drive and control system for driving and controlling the vehicle, said drive and control system of the vehicle being provided with an electric drive motor and a battery system for storing electrical energy, said battery system being connected to the electric drive motor;

a regulating unit, which is provided with a transmitting and receiving device, said regulating unit being connected to the drive and control system for the regulation thereof; and a movement device for moving the material lying on the substrate as the vehicle moves;

at least one charging station for the vehicle, said charging station being located in the operating area and being provided with a charging system to charge the battery system of the vehicle; and a central operating system which is provided with a transmitting and receiving device which is designed to communicate with the transmitting and receiving device of the regulating unit of the vehicle, wherein the central operating system is provided with a memory in which data are stored comprising navigation data, on the basis of which the vehicle can travel an entire predetermined route from a charging station through at least a part of the operating area and then to a charging station, and the central operating system is designed to transmit a first packet of data comprising these navigation data from the transmitting and receiving device of the central operating system to the transmitting and receiving device of the regulating unit of the vehicle, and the regulating unit of the vehicle is provided with a memory for storing the first packet of data, and wherein the regulating unit of the vehicle is designed to regulate the drive and control system of the vehicle on the basis of the first packet of data in order for the vehicle to travel along said entire predetermined route, wherein after the vehicle has returned to the charging station, the central operating system is configured to transmit a second packet of data, different from the first packet of data, from the transmitting and receiving device of the central operating system to the transmitting and receiving device of the regulating unit of the vehicle, and wherein the regulating unit of the vehicle is configured to regulate the drive and control system of this vehicle on the basis of the second packet of data in order for this vehicle to travel along a second predetermined route that is different than the first predetermined route.

2. The system as claimed in claim 1, wherein the operating area comprises a livestock building, in which at least one charging station for the vehicle is disposed, wherein the livestock building comprises the substrate with a substantially flat floor on which the material is located and wherein the movement device of the vehicle is designed to shift the material lying on the substrate over the floor as the vehicle moves.

3. The system as claimed in claim 2, wherein the material is manure and the floor comprises a grid floor with openings in which the manure is located, and wherein a manure storage space is located under the grid floor, and wherein the movement device of the vehicle is provided with a pushing element to shift the manure over the floor as the vehicle moves in such a way that the manure falls through the openings of the grid floor into the manure storage space.

4. The system as claimed in claim 2, wherein the livestock building is provided with at least one feedway which is limited on at least one side by a feeding rack, and wherein, seen from the feedway, standing stations for animals are provided behind the feeding rack, and wherein the data stored in the memory of the central operating system comprise navigation data, on the basis of which the vehicle can travel a route from a charging station to the feedway and at least partially through the feedway and then to a charging station.

5. The system as claimed in claim 4, wherein feed is located on the floor, and wherein the movement device of the vehicle is designed to shift the feed over the floor as the vehicle moves through the feedway in such a way that the feed is moved in the direction of the feeding rack.

6. The system as claimed in claim 4, wherein the system is provided with a plurality of feedways, each being limited on at least one side by a feeding rack, and wherein, seen from the feedway, standing stations for animals are provided behind the feeding rack, and wherein the data stored in the memory of the central operating system comprise navigation data, on the basis of which the vehicle can travel a route from at least one charging station in each case to at least one of the feedways and at least partially through this feedway or feedways and then to a charging station, and wherein at least one of the feedways can be selected in the central operating system, and wherein the central operating system is designed to determine the first or second packet of data from the data stored in the memory of the central operating system in such a way that the first or second packet of data is provided with navigation data, on the basis of which the vehicle can travel a route from a charging station to the selected feedway or feedways and at least partially through this selected feedway or feedways and then to a charging station, and wherein the central operating system is designed to transmit the first or second packet of data from the transmitting and receiving device of the central operating system to the transmitting and receiving device of the regulating unit of the vehicle.

7. The system as claimed in claim 1, wherein the material is manure and the operating area comprises a livestock building, in which at least one charging station for the vehicle is disposed, wherein the livestock building comprises the substrate with a substantially flat floor on which the manure is located, and wherein the vehicle comprises a manure storage tank, and wherein the movement device of the vehicle is designed to shift the manure from the floor to the manure storage tank, by vacuuming or scooping up the manure from the floor.

8. The system as claimed in claim 1, further comprising:
a second self propelled vehicle, which is provided with:
a plurality of wheels, which are movable over the substrate;
a drive and control system for driving and controlling the second vehicle, said drive and control system of the second vehicle being provided with an electric drive motor and a battery system for storing electrical energy, said battery system being connected to the electric drive motor, and said battery system being chargeable by the charging system; and
a regulating unit, which is provided with a transmitting and receiving device, said regulating unit being connected to the drive and control system for the regulation thereof,
wherein the transmitting and receiving device of the central operating system is designed to communicate with the transmitting and receiving device of the regulating unit of the second vehicle, and wherein data are stored in the memory of the central operating system comprising navigation data, on the basis of which the second vehicle can travel an entire predetermined route from a charging station through at least a part of the operating area and then to a charging station, and the central operating system is designed to transmit a third packet of data comprising these navigation data from the transmitting and receiving device of the central operating system to the transmitting and receiving device of the regulating unit of the second vehicle, and the regulating unit of the second vehicle is provided with a memory for storing the third packet of data, and the regulating unit of the second vehicle is designed to regulate the drive and control system of the second vehicle on the basis of the third packet of data in order for the vehicle to travel along said entire predetermined route.

9. The system as claimed in claim 8, wherein the operating area comprises a livestock building, in which at least one charging station for the second vehicle is disposed, wherein the livestock building comprises the substrate with a substantially flat floor on which the material is located, and
wherein the second vehicle is provided with a movement device which is designed to shift the material over the floor as the second vehicle moves.

10. The system as claimed in claim 8, wherein the second vehicle is a feed vehicle, comprising:
a container to hold feed; and
a delivery device to deliver feed held in the container, wherein the system is provided with:
a feed stock system to contain at least one type of feed;
a feed loading station for the feed vehicle, said feed loading station being located in the operating area;
a feed loading device which is designed to transfer feed from the feed stock system to the container of the feed vehicle when the feed vehicle is set up on the feed loading station; and
a feeding station for feeding animals, said feeding station being located in the operating area at a distance from the feed loading station, and said feeding station being reachable for the feed vehicle from the feed loading station by moving the feed vehicle with the wheels thereof over the substrate, and
wherein data are stored in the memory of the central operating system, on the basis of which the feed vehicle can travel an entire predetermined route from the feed loading station, which is provided with a loading station for the feed vehicle, to the feeding station, and the central operating system is designed to transmit the third packet of data comprising these navigation data from the transmitting and receiving device of the central operating system to the transmitting and receiving device of the regulating unit of the feed vehicle, and the regulating unit of the feed vehicle is provided with a memory for storing the third packet of data, and the regulating unit of the feed vehicle is designed to regulate the drive and control system of the feed vehicle on the basis of the third packet of data for the feed vehicle to travel along said entire predetermined route from the feed loading station to the feeding station.

11. The system as claimed in claim 10, wherein the data stored in the memory of the central operating system comprise operating data for operating the delivery device of the feed vehicle, and wherein the third packet of data is provided with these operating data, and wherein the regulating unit of the feed vehicle is designed to operate the delivery device of the feed vehicle on the basis of these operating data.

12. The system as claimed in claim 1, wherein the operating area of the system is provided with a plurality of markers, wherein the or each vehicle is provided with a sensor system to detect the markers, and wherein the navigation data stored in the memory of the central operating system comprise marker data of the markers, and
wherein the navigation data of the first and second packets of data are provided with these marker data, and wherein the regulating unit of the vehicle is designed to regulate the drive and control system of this vehicle on the basis of these marker data and the detections of the sensor system.

13. The system as claimed in claim 12, wherein the markers are provided with a strip, disposed in or on the substrate, a wall and/or an impact point, wherein the marker data of the navigation data of the first and second packets of data comprise the following of the strip by means of the sensor system of the vehicle and/or the following of the wall by means of the sensor system of the vehicle and/or the traveling against an impact point which is detectable by the sensor system of the vehicle.

14. The system as claimed in claim 1, wherein the vehicle is provided with a gyroscope, and wherein the navigation data of the first and second packets of data comprise the traveling of the vehicle straight ahead over a predetermined distance on the basis of the gyroscope.

15. The system as claimed in claim 1, wherein the central operating system is designed to transmit the first and second packets of data from the transmitting and receiving device of the central operating system to the transmitting and receiving device of the regulating unit of the vehicle and/or of a second vehicle while this vehicle is set up on a charging station.

16. The system as claimed in claim 1, wherein the central operating system is designed to transmit the first and second packets of data in one step from the transmitting and receiving device of the central operating system to the transmitting and receiving device of the regulating unit of the vehicle and/or of a second vehicle.

17. The system as claimed in claim 1, wherein the material on the substrate of the operating area is feed and/or manure.

18. A method for feeding animals, wherein comprising the steps of:
providing a system for performing an animal related action, said system comprising:
an operating area with a substrate on which material lies;
a first and/or second self-propelled vehicle, which is provided with:
a plurality of wheels, which are movable over the substrate;
a drive and control system for driving and controlling the vehicle, said drive and control system of the vehicle being provided with an electric drive motor and a battery system for storing electrical energy, said battery system being connected to the electric drive motor;
a regulating unit, which is provided with a transmitting and receiving device, said regulating unit being connected to the drive and control system for the regulation thereof and comprising a memory for storing packets of data, wherein the regulating unit is designed to regulate the drive and control system of the vehicle on the basis of said packet of data in order for the vehicle to travel along the entire first predetermined route; and
a movement device for moving the material lying on the substrate as the vehicle moves;
at least one charging station for the vehicle, said charging station being located in the operating area and being provided with a charging system to charge the battery system of the vehicle; and
a central operating system which is provided with a transmitting and receiving device which is designed to communicate with the transmitting and receiving device of the regulating unit of the vehicle, wherein the central operating system is provided with a memory in which data are stored comprising navigation data, on the basis of which the vehicle can travel an entire first predetermined route from a charging station through at least a part of the operating area and then to a charging station;
transmitting, with the central operating system, a first packet of data from the transmitting and receiving device of the central operating system to the transmitting and receiving device of the regulating unit of the vehicle and/or of the second vehicle;
regulating with the regulating unit of the vehicle and/or of the second vehicle, the drive and control system of this vehicle on the basis of the first packet of data in order for this vehicle to travel along said entire first predetermined route;
after the vehicle has returned to the charging station, transmitting with the central operating system a second packet of data, different than the first packet of data, from the transmitting and receiving device of the central operating system to the transmitting and receiving device of the regulating unit of the vehicle and/or of the second vehicle, and
regulating, with the regulating unit of the vehicle and/or of the second vehicle, the drive and control system of this vehicle on the basis of the second packet of data in order for this vehicle to travel along a second predetermined route that is different than the first predetermined route.

* * * * *